UNITED STATES PATENT OFFICE.

JOSEPH STEHLIN, OF NEW YORK, N. Y.

PROCESS OF PRODUCING STOCK FOOD.

1,036,925.   Specification of Letters Patent.   Patented Aug. 27, 1912.

No Drawing. Original application filed March 29, 1911, Serial No. 617,563. Divided and this application filed May 18, 1911. Serial No. 627,935.

*To all whom it may concern:*

Be it known that I, JOSEPH STEHLIN, a citizen of the United States of America, residing at Manhattan borough, city, county, and State of New York, have invented certain new and useful Improvements in Processes of Producing Stock Food, of which the following is a full, clear, and exact description.

My invention relates to a process for producing animal or stock food and has for its object to utilize what has heretofore been a waste product, so that same may become a valuable article of commerce for use as a nutritive food for cattle or other live stock.

In producing animal or stock food by my improved process I utilize what are known as "spent" hops, that is to say, hops which have been used in breweries in the manufacture of malt liquors and which have heretofore, after such use, been a waste product and of little or no value commercially, and I mix or combine the same with other vegetable food products, such as dried brewers' grains, as hereinafter described. Such waste or spent hops, after having gone through the brewing stages are in a highly saturated or moist condition; and in carrying out my invention, the moist spent hops are preferably first placed in suitable presses to extract excess moisture, whereupon the spent hops are dried and are or may be partially cooked or steamed in suitable apparatus of well known construction, the drying being effected to such an extent that sufficient moisture is eliminated to avoid subsequent decomposition of the product. I find that drying to an extent whereby about eight per cent. moisture remains, is most satisfactory. After the drying has taken place, the stems of the spent hops are or may be eliminated therefrom, although the removal of the stems is not absolutely necessary. Thereupon the dried spent hops are broken up or may be ground or triturated into powder form, and mixed in suitable proportions with dried brewers' grains, malt-sprouts or other vegetable products or animal foodstuffs, in which condition the product is suitable for use as animal or stock food. Before feeding live stock therewith, the aforesaid food is preferably mixed with water or other suitable liquid.

Instead of treating the spent hops separately, as aforesaid, and after treatment mixing the same with the brewers' grains or other vegetable matter, the moist spent hops and the moist brewers' grains or the like, may first be mixed together and this mixture treated in accordance with the aforesaid process.

I have found my improved product to be a highly nutritive and valuable food for use as a cheap animal food-stuff.

The subject-matter of the appended claims is a division of an application filed by me March 29, 1911, Serial No. 617,563, for improvements in animal food product and process of producing same.

Having now described my invention, what I claim and desire to secure by Letters Patent is—

1. The herein described process of producing stock-food, comprising extracting excess moisture from a mixture of moist spent hops and moist brewers' grains, and thereupon partially cooking and drying the same.

2. The herein described process of producing stock-food consisting in first extracting excess moisture from a mixture of moist spent hops and moist brewers' grains, thereupon drying and partially cooking the same, and finally reducing the product to powder form.

Signed at New York city, N. Y., this 16th day of May 1911.

JOSEPH STEHLIN.

Witnesses:
 J. W. HOLBURN,
 CHAS. S. BENNETT.